United States Patent [19]

Takemori

[11] Patent Number: 5,061,860

[45] Date of Patent: Oct. 29, 1991

[54] DEFORMATION MEASURING METHOD AND DEVICE USING COMB-TYPE PHOTOSENSITIVE ELEMENT ARRAY

[75] Inventor: Tamiki Takemori, Shizuoka, Japan

[73] Assignee: Hamamatsu Photonics Kabushiki Kaisha, Shizuoka, Japan

[21] Appl. No.: 367,599

[22] Filed: Jun. 19, 1989

[30] Foreign Application Priority Data

Jun. 22, 1988 [JP] Japan ................... 63-154297

[51] Int. Cl.$^5$ ............................................. G01V 9/04
[52] U.S. Cl. ..................................... 250/561; 356/376
[58] Field of Search ................ 250/560, 561; 356/376, 356/371; 364/822

[56] References Cited

U.S. PATENT DOCUMENTS 4,678,920  7/1987  Iadipaolo et al. ................ 250/560
4,790,660  12/1988 Ito et al. ............................. 356/376
4,794,262  12/1988 Sato et al. ......................... 250/560

OTHER PUBLICATIONS

Yamaguchi, "Advances in the Laser Speckle Strain Gauge", Optical Engineering, vol. 27, No. 3, pp. 214–218, Mar. 1988.
Ogita et al. "Optical Three-Dimensional Displacement Meter", SPIE International Conference on Speckle, vol. 556, pp. 139–145, 1985.
Yamaguchi, "Real-Time Measurement of In-Plane Translation and Tilt by Electronic Speckle Correlation", Japanese Journal of Applied Physics, vol. 19, No. 3, pp. L133–L136, Mar. 1980.

Primary Examiner—David C. Nelms
Assistant Examiner—Que T. Le
Attorney, Agent, or Firm—Finnegan, Henderson, Farabow, Garrett and Dunner

[57] ABSTRACT

A deformation measuring method and device in which an object is irradiated with a laser beam before and after deformation of the object to obtain speckle patterns, the speckle patterns thus obtained are photoelectrically converted into electrical signals, and the cross-correlation function between the speckle patterns is calculated using the electrical signals to obtain displacement of the speckle pattern on the basis of the shift of position of the extreme value of the cross-correlation function and to determine the amount of deformation of the object from the displacement of the speckle pattern. Each of photosensitive elements for converting the speckle patterns into the electrical signals has a rectangular form of a large ratio of a long side to a short side and a photosensitive element array comprising the photosensitive elements has a comb structure in which the photosensitive elements having the above structure are arranged in a strip form.

4 Claims, 3 Drawing Sheets

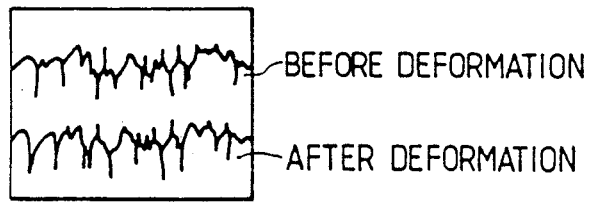
FIG. 3(A) — BEFORE DEFORMATION / AFTER DEFORMATION
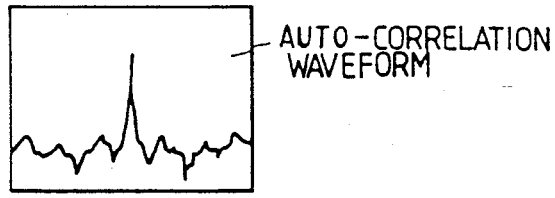
FIG. 3(B) — AUTO-CORRELATION WAVEFORM
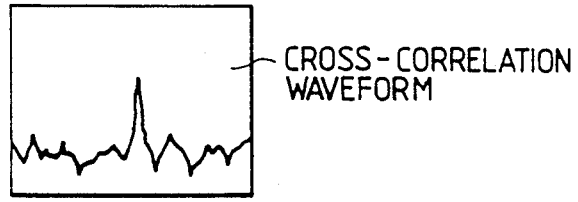
FIG. 3(C) — CROSS-CORRELATION WAVEFORM
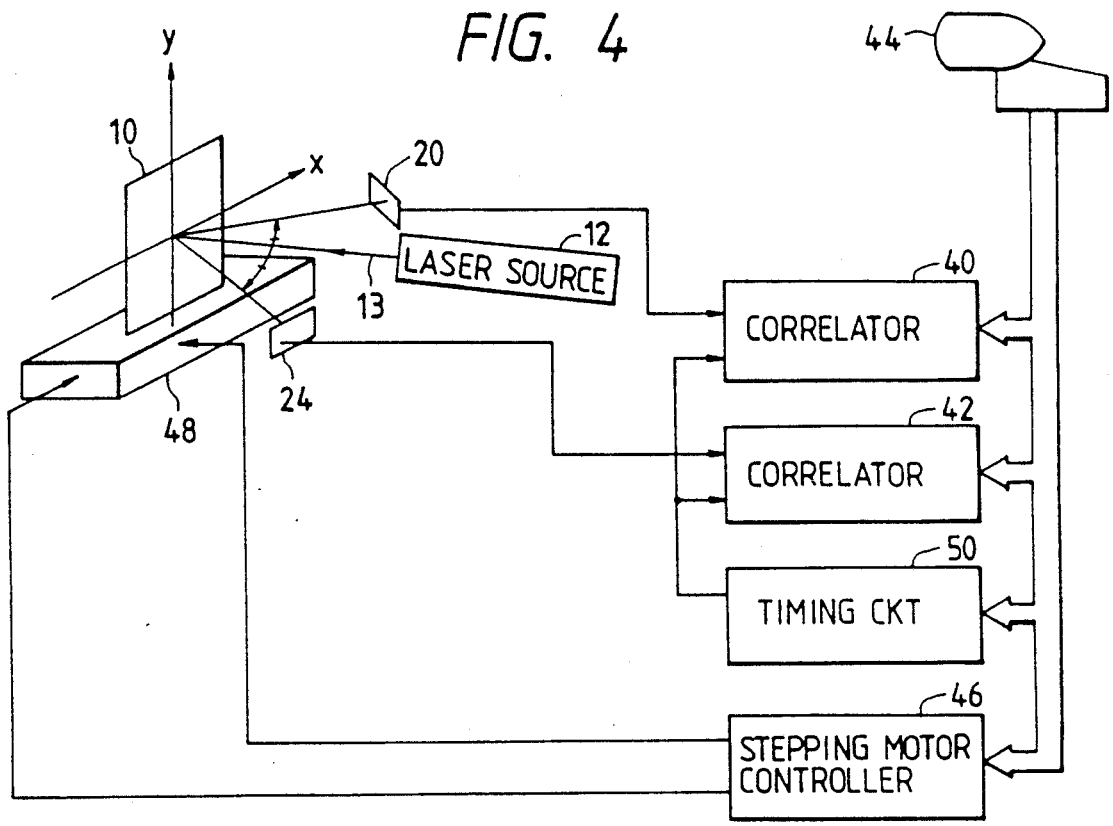
FIG. 4

DEFORMATION MEASURING METHOD AND DEVICE USING COMB-TYPE PHOTOSENSITIVE ELEMENT ARRAY

BACKGROUND OF THE INVENTION

This invention relates to a deformation measuring method and device, and more particularly to an improvement of deformation measuring method and device in which a part of the surface of an object is irradiated with a laser beam before and after being deformed, to obtain speckle patterns, and the amount of deformation of the object is determined on the basis of the cross-correlation function between the speckle patterns.

A speckle pattern is formed by interference of diffusion lights which are reflected from a rough surface of an object when a laser beam is applied to the surface. When the surface is displaced or deformed, the speckle pattern is displaced while the surface is gradually deformed. In this connection, a "speckle correlation method" has been proposed in the art in which a speckle pattern is photoelectrically scanned and the speckle displacement is obtained from the correlative peak positions of the signals thus obtained, and the relations between the speckle displacement and the displacement (or deformation) of the surface of the object are utilized to measure the minute deformation of the object due to translation, rotation and distortion or the like. This method is disclosed in detail in Japanese Patent Publication No. 52963/1984; "Laser Science Research" No. 6, pp 152-154 (1984) and "Latest Precision Measurement Technology" pp 241-244, on July 1, 1987.

Of the speckle correlation methods, the most practical method uses a one-dimensional image sensor 15 and a micro-computer 16 as shown in FIG. 6. By this method, a parallel movement of 1 $\mu$m or more and a rotation of the order of $10^{-5}$ rad can be measured.

In the device as shown in FIG. 6, a laser beam about 1 mm in diameter which is generated by a laser source 12 is applied to a measuring point on an object, through a magnifying lens 14 if necessary, and the one-dimensional image sensor 15 is disposed in the propagating passage of the light beam reflected from the measuring point. In this case, the beam diameter W on the object 10 and the distance Lo between the object 10 and the image sensor 15 are adjusted so that an average diameter of the speckle pattern of approximately $\lambda Lo/W$ ($\lambda$: wavelength of the laser beam) on the sensor 15 is larger than the pitch interval (10 to 20 $\mu$m) of the sensor. In addition, the axis of the one-dimensional image sensor 15 is adjusted so as to be coincided with the direction of displacement of the speckle pattern which is determined by the optical system and the kind of displacement (the direction of parallel movement, rotation or distortion) of the object.

The output of the one-dimensional image sensor 15 is subjected to A-D (analog-to-digital) conversion and applied to a micro-computer 16. A correlation unit 18 calculates a cross-correlation function between the outputs of the micro-computer which correspond to the speckle patterns before and after the deformation of the object, and the speckle displacement is obtained from the peak positions of the correlation function substantially in real time. In this connection, in order to reduce the time required for calculation of the cross-correlation function, a method of calculating a "characteristic correlation" has been proposed in the art. In this method, the output signals of the one-dimensional image sensor 15 are binary-coded with respect to the average thereof. The speckle pattern thus obtained has high contrast, so that the peak position is coincided with that of the ordinary cross-correlation function at all times. Accordingly, the speckle displacement can be detected from the extreme position of the cross-correlation function.

However, the conventional device is disadvantageous in the following points: The one-dimensional image sensor 15 employs photosensitive elements each having a substantially square form. Therefore, when the axis of the photosensitive element array is not coincided with the direction of displacement of the speckle pattern, it is impossible to accurately determine the position of the extreme value of the cross-correlation function. Accordingly, it is necessary to perform an operation of coinciding the axis of the photosensitive element array with the direction of displacement of the speckle pattern at all times. Thus, the operation of the device is rather intricate and troublesome. In addition, it is impossible to detect the direction of the speckle displacement.

SUMMARY OF THE INVENTION

An object of this invention is to eliminate the above-described difficulties accompanying a conventional deformation measuring method and device.

More specifically, an object of the invention is to provide a deformation measuring method and device in which it is unnecessary to coincide the direction of displacement of a speckle pattern with the axis of a photosensitive element array for converting the speckle pattern into an electrical signal.

Another object of the invention is to provide a deformation measuring method and device which can detect the direction and amount of displacement of a speckle pattern.

In order to attain the above objects, according to the deformation measuring method and device of this invention, an object is irradiated with a laser beam before and after being deformed, to obtain speckle patterns, and the speckle patterns thus obtained are photoelectrically converted into electrical signals, and the mutual-correlation function between the electrical signals is obtained, so that the amount of deformation of the object is determined from the amount of displacement of the speckle pattern which is obtained as a shift of the position of the extreme value of the cross-correlation function. A photosensitive element array comprising photosensitive elements is in a comb form and each of the photosensitive elements is in the form of a strip of fancy paper, that is, a rectangular form having a large ratio of a long side to a short side. Further, plural photosensitive element arrays may be arranged with angles therebetween.

BRIEF DESCRIPTION OF THE DRAWINGS

FIG. 2 is a perspective view for explaining the principle of measurement in a speckle correlation method, in which FIGS. 3(A), 3(B) and 3(C) are diagrams showing the output waveform, auto-correlation waveform and cross-correlation waveform of a one-dimensional image sensor, respectively;

FIG. 4 is a perspective view showing the arrangement of one example of a deformation measuring device for practicing the method of the invention;

DETAILED DESCRIPTION OF THE INVENTION

Preferred embodiments of the invention will be described hereinunder with reference to the accompanying drawings.

First, the principle of measurement in a deformation measurement method according to the invention will be described with reference to FIG. 2.

Figure 2:
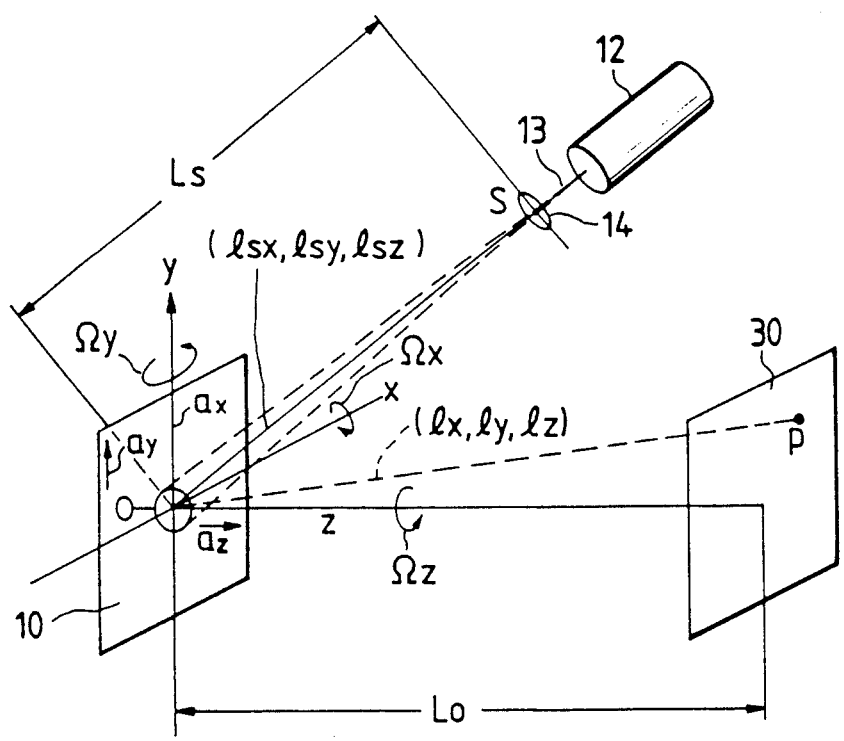

As shown in FIG. 2, a laser beam 13 outputted by a laser source 12 is applied to a measuring region 0 of an object 10, through a magnifying lens 14 if necessary, and the resultant speckle pattern is observed on an observation plane 30. In this case, it is assumed that the coordinate axes on the object's surface are represented by x, y and z; the distance OS between the divergence point of the laser beam 13 and the measuring region O, Ls (OS=Ls); components representing the direction from the divergence point to the center of the region O, lsx, lsy and lsz; the distance between the object's surface and the observation plane 30, Lo; components representing the direction from the center of the region O to an observation point P, lx, ly and lz; and the components of translation, rotation and distortion of the object 10 at the region irradiated by the laser beam 13, (ax, ay, az), ($\Omega x$, $\Omega y$, $\Omega z$) and ($\epsilon xx$, $\epsilon yx$, $\epsilon yy$), respectively.

Speckle patterns are formed at the observation point P before and after deformation of the object. The cross-correlation function $C(\bar{x},\bar{y})$ between the intensity distributions $I_1(x,y)$ and $I_2(x,y)$ of the speckle patterns thus formed is as follows:

$$C(\bar{x},\bar{y}) = <I_1(x,y) \times I_2(x+\bar{x},y+\bar{y})> \quad (1)$$

where $<>$ means a set average.

Calculating equation (1), it can be understood that $C(\bar{x},\bar{y})$ has a maximum value with $\bar{x}=Ax$ and $\bar{y}=Ay$, where Ax and Ay are represented by the following equations (2) and (3) and physically correspond to the amount of displacement of the speckle pattern caused by the deformation of the object:

$$\begin{aligned}
Ax = & -ax[(Lo/Ls)(lsx^2 - 1) + lx^2 - 1] \\
& -ay[(Lo/Ls)lsx\,lsy + lx\,ly] \\
& -az[(Lo/Ls)lsx\,lsz + lx\,lz] - Lo[-\Omega z(lsy + ly) \\
& -\Omega y(lsz + lz) + \epsilon xx(lsx + lx) + \epsilon xy(lsy + ly)]
\end{aligned} \quad (2)$$

$$\begin{aligned}
Ay = & -ax[(Lo/Ls)(lsy\,lsx + ly\,lx)] \\
& -ay[(Lo/Ls)(lsy^2 - 1) + ly^2 - 1] \\
& -az[(Lo/Ls)lsy\,lsz + lx\,lz] - Lo[-\Omega z(lsx + lx) \\
& -\Omega x(lsz + lz) + \epsilon yy(lsy + ly) + \epsilon xy(lsx + lx)]
\end{aligned} \quad (3)$$

Accordingly, when the amount of displacement of the speckle pattern (Ax and Ay) are observed with a one-dimensional image sensor disposed at the observation plane 30, the output waveform of the image sensor changes as shown in FIG. 3A after and before deformation of the object, the auto-correlation waveform is as shown in FIG 3(B), and the cross-correlation waveform is as shown in FIG. 3(C).

In the case where the deformation of an object is measured with the device, in the conventional method the photosensitive elements of the one-dimensional image sensor arranged in the observation plane 30 are substantially square. On the other hand, in the invention, a photosensitive element array is a one-dimensional image sensor in a comb form as shown in FIG. 1, and each of photosensitive elements (- - -, $22_{n-1}$, $22_n$, $22_{n+1}$, - - -) constituting the photosensitive element array has a form of a strip of fancy paper, that is, a rectangular form of a large ratio of a long side to a short side (for example, 13 $\mu m \times 2.5$ mm), and is arranged at an interval of 25 $\mu m$, for instance.

Figure 1:
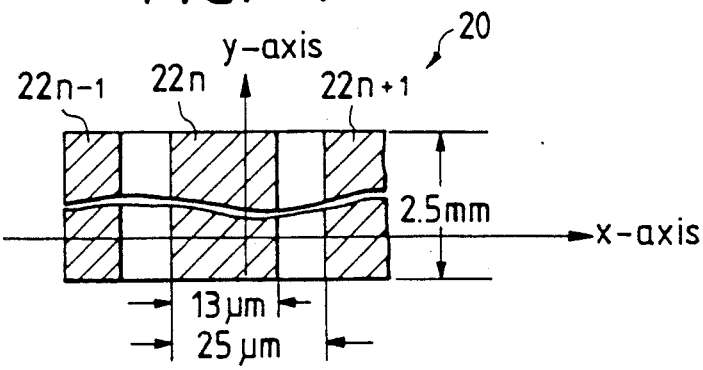
FIG. 1 is a front view showing an embodiment of a photosensitive element array used in a deformation measuring method and device according to this invention.

As shown in FIG. 1, the photosensitive element array 20 is laid along an x-axis, and the long side of each photosensitive element is along a y-axis. Under this condition, only the component of the speckle pattern which is displaced along the y-axis will be described.

A larger part of the output components of the photosensitive element provided after the speckle displacement are proportional to the integration of the optical intensity of the speckle pattern over the area of the photosensitive element before the speckle displacement. The output components different from those provided before the speckle displacement correspond to the difference in optical intensity between the speckle pattern coming out of the photosensitive area of the photosensitive element and the speckle pattern newly coming therein, so that it occupies a small rate of contribution to the total output components and therefore is negligible.

When the amount of speckle displacement along the y-axis is larger, the rate of the different output components to the total output components is increased. On the other hand, due to the nature of the speckle pattern, the uniformity of the output components is increased as the photosensitive area is larger. Hence, in the case where, according to the invention, each photosensitive element is designed so as to be large in photosensitive area and to be in a rectangular form of a large ratio of a long side to a short side, the quantity of light deviated from the photosensitive area and the quantity of light entering the photosensitive area are made equal to each other by the above-described uniformity of the output components. Thus, even in the case where the amount of speckle displacement is large, the output is maintained substantially unchanged.

Accordingly, the change of the output of the photosensitive element array 20 due to the speckle displacement along the y-axis can be disregarded, and even when the direction of the speckle displacement is not coincided with the axis of the photosensitive element array, only the effect of the speckle displacement along the x-axis over the photosensitive element array can be obtained. In other words, where the direction of the speckle displacement to the x-axis is represented by $\theta$, only the components of $\cos \theta$ are detected and the amount of deformation of the object in that direction can be measured.

In the case where a plurality of photosensitive arrays are arranged so that those arrays form various angles with one another, the components of the speckle displacement along the axes of the photosensitive element arrays can be extracted. Accordingly, the displacement of a speckle pattern having arbitrary direction and amount can be detected, and therefore the amount of deformation of the object can be measured with high accuracy. Further, in the case where the photosensitive arrays each having a comb structure are vertically arranged to each other, the x-component and y-component of the speckle displacement can be obtained independently of each other.

A preferred embodiment of this invention will be described in detail with reference to FIG. 4 in detail.

An embodiment of the deformation measuring device for practicing the deformation measuring method according to the invention, as shown in FIG. 4, comprises: a laser source 12 for applying a laser beam 13 to the surface of an object 10 to be measured to form a speckle pattern. In order to subject the speckle pattern to photoelectric conversion, two photosensitive element arrays 20 and 24 are arranged with an angle therebetween. As shown in FIG. 1, each of the photosensitive element arrays has a comb structure in which photosensitive elements each having a rectangular form of a large ratio of a long side to a short side are arranged in a strip form.

The speckle pattern, after photoelectrically converted into electrical signals by the photosensitive element arrays 20 and 24, is applied to correlators 40 and 42 for calculating a cross-correlation function between the electrical signals, so that the changes in position of the extreme values of the cross-correlation functions provided before and after the displacement of the speckle pattern are detected. The information on the shift in position of the extreme values are applied to and processed by a computer 44, in which the amount of deformation of the object is calculated from the amount of displacement of the speckle pattern.

The computer 44 applies an instruction to a stepping motor controller 46 to move a linear stage 48 along the x-axis, which causes the speckle pattern to be displaced along the x-axis, and applies timing signals through a timing circuit 50 to the correlators 40 and 42.

Figure 5:
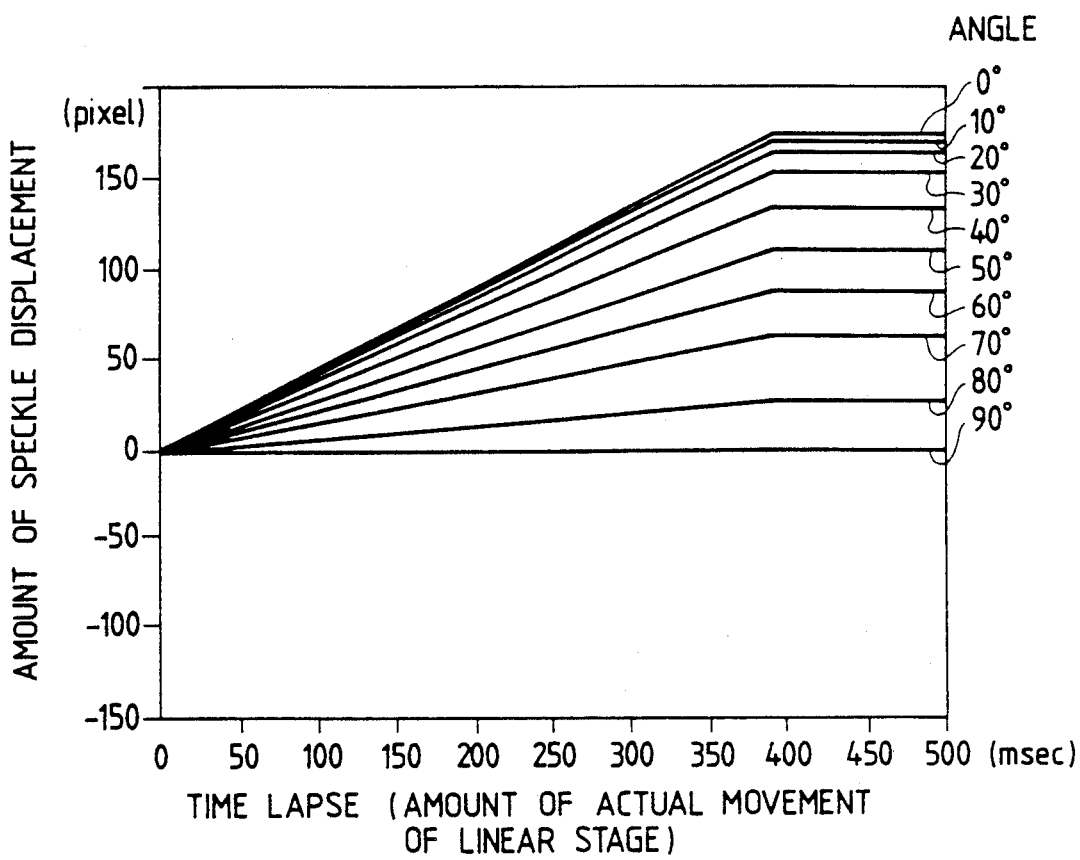
FIG. 5 is a graph indicating the amount of displacement of a speckle pattern with time (the amount of movement of a linear stage) with a set angle as parameter.
Figure 6:
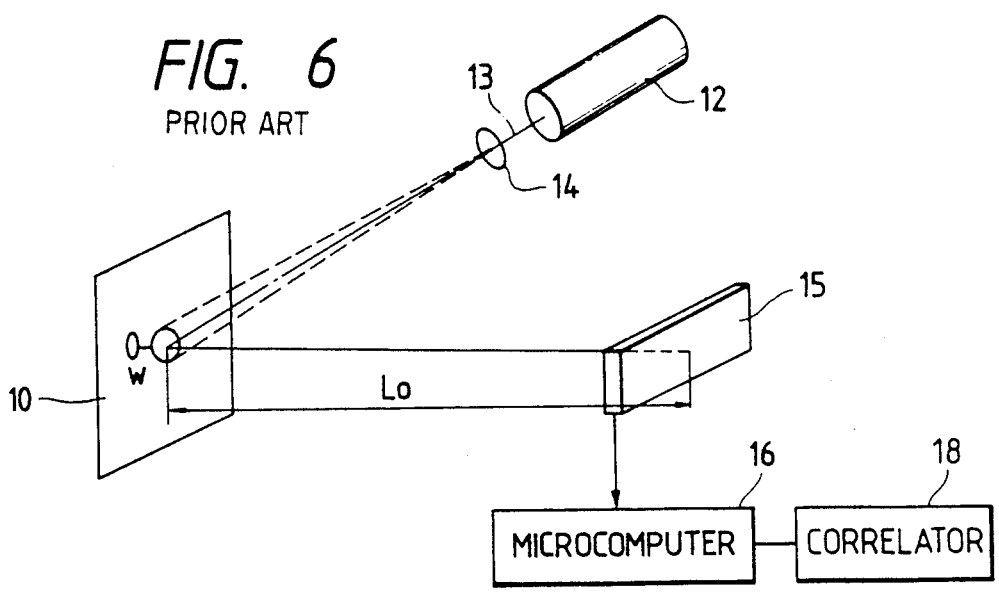
FIG. 6 is a perspective view showing the arrangement of one example of a deformation measuring device practicing a conventional speckle correlation method.

In the case where the photosensitive element array 24 is shifted(rotated) at angular intervals of 10° with respect to the x-axis, and the linear stage 48 is moved at a distance of 6 mm at a speed of 6 mm/0.5 sec., the amount of displacement of the speckle pattern over the photosensitive element array 24 in the case where the speckle pattern is displaced at a predetermined distance changes as shown in FIG. 5. In this case, for the purpose of comparison with the output of the photosensitive element array 24 provided through the correlator 42, the output of the comb-shaped photosensitive element array 20 which is fixedly arranged in parallel with the x-axis is also detected with the correlator 40, and the displacements of the speckle pattern are observed. As is apparent from FIG. 5, although the amount of displacement of the speckle pattern is maintained constant, by changing the angle of the photosensitive element array 24 the amount of displacement of the speckle pattern over the photosensitive element array 24 is changed.

These data are arranged in order, and the resultant amounts of displacement are utilized to calculate the angles of the photosensitive element arrays 24 with respect to the x-axis. The results of calculation are as indicated in the following table.

TABLE

| angle (degree) | 10 | 20 | 30 | 40 | 50 | 60 | 70 | 80 | 90 |
|---|---|---|---|---|---|---|---|---|---|
| speckle displacement (A) of fixed array (pixel) | 178 | 175 | 178 | 176 | 176 | 178 | 175 | 178 | 177 |
| speckle displacement (B) of rotating array (pixel) | 171 | 164 | 152 | 133 | 109 | 86 | 61 | 26 | 2 |
| $\cos^{-1}(B/A)°$ | 13.7 | 20.4 | 31.4 | 40.9 | 51.7 | 81.1 | 89.6 | 81.6 | 90.6 |

As is apparent from Table, the amounts of speckle displacement B detected by the photosensitive element array 24 correspond to the extraction of the $\cos\theta$ components with respect to the x-axis.

Accordingly, when the comb-shaped photosensitive element arrays are arranged, for instance, at right angles with each other, then the x-component and y-component of the speckle displacement can be independently obtained, so that the displacement of the speckle pattern having arbitrary direction and amount can be calculated.

The above-described embodiment uses two photosensitive element arrays; and therefore, the direction and amount of displacement of the speckle pattern are measured with a minimum number of photosensitive element arrays. However, the invention is not limited thereto or thereby. For example, in the case where only the speckle displacement along the x-axis is extracted, only one photosensitive element array may be provided. Further, the use of more than two photosensitive element arrays will result in the measurement with higher accuracy.

What is claimed is:

1. A deformation measuring method of detecting the amount of deformation of an object from displacement of a speckle pattern of the object, comprising the steps of:

irradiating the object with a laser beam before and after deformation of the object to obtain speckle patterns;

arranging at least one photosensitive element array comprising photosensitive elements for converting the speckle patterns into electrical signals, each of said photosensitive elements having a rectangular form of a large ratio of a long side to a short side and said photosensitive element array having a comb structure in which said photosensitive elements are arranged in a strip form;

calculating a cross-correlation function between the speckle patterns from the electrical signals to obtain an extreme value of the cross-correlation function and the position thereof; and obtaining the amount of position shift of the extreme value of the cross-correlation function to determine the amount of the deformation of the object.

2. A deformation measuring method as claimed in claim 1, wherein said arranging step comprises the step of arranging a plurality of photosensitive element arrays in such a manner that said photosensitive element arrays form angles with one another.

3. A deformation measuring device for detecting the amount of deformation of an object from displacement of a speckle pattern of the object, comprising:

light source means for irradiating the object with a laser beam to obtain speckle patterns before and after deformation of the object;

photosensitive element array means comprising plural photosensitive elements for converting the speckle patterns of the object into corresponding electrical signals, each of said photosensitive elements having a rectangular form of a large ratio of a long side to a short side, and said photosensitive element array having a comb structure in which said photosensitive elements are arranged in a strip form;

cross-correlation calculating means for calculating a cross-correlation function between the speckle patterns using the electrical signals and obtaining the position of an extreme value of the cross-correlation function; and microcomputer means for calculating the amount of shift in position of the extreme value of the cross-correlation function and determining the amount of deformation of the object from the amount obtained by said microcomputer means.

4. A deformation measuring device as claimed in claim 3, wherein said photosensitive element array means comprises plural photosensitive element arrays arranged in such a manner as to form angles with one another.

* * * * *